United States Patent [19]

Scarpelli

[11] Patent Number: 5,064,470

[45] Date of Patent: Nov. 12, 1991

[54] HIGH SOLIDS, LOW VISCOSITY CARBONLESS PAPER GELATIN BASE MICROCAPSULE SYSTEM

[75] Inventor: Joseph A. Scarpelli, Dayton, Ohio

[73] Assignee: Eurand America, Inc., Vandalia, Ohio

[21] Appl. No.: 385,652

[22] Filed: Jul. 27, 1989

[51] Int. Cl.$^5$ .................. B01J 13/10; C09D 11/04
[52] U.S. Cl. .................. 106/21; 264/4.1; 264/4.3; 428/402.2; 503/214
[58] Field of Search .................. 428/402.2; 106/21; 503/214

[56] References Cited

U.S. PATENT DOCUMENTS

| | | | |
|---|---|---|---|
| 3,697,437 | 10/1972 | Fogle et al. | 428/402.2 X |
| 3,840,467 | 10/1974 | Matsukawa et al. | 428/402.2 X |
| 3,855,146 | 12/1974 | Saeki et al. | 428/402.2 X |
| 3,872,024 | 3/1975 | Hörger | 428/402.2 X |
| 3,876,572 | 4/1975 | Sliwka et al. | 524/521 X |
| 4,082,688 | 4/1978 | Egawa et al. | |
| 4,087,376 | 5/1978 | Foris et al. | 264/407 |
| 4,105,823 | 8/1978 | Hasler et al. | 428/307 |
| 4,205,060 | 5/1980 | Monsimer et al. | 424/495 |
| 4,760,108 | 7/1988 | Asano et al. | 524/451 |
| 4,808,408 | 2/1989 | Baker et al. | 424/508 |
| 4,822,416 | 4/1989 | Langlais et al. | 106/21 |

*Primary Examiner*—Richard D. Lovering
*Attorney, Agent, or Firm*—Adley F. Mandrel

[57] ABSTRACT

This disclosure is directed to a high solid, low viscosity carbonless paper gelatin base microcapsule system producing microcapsules having sizes characteristically from about 3 to about 10 microns (micrometers) and being characterized as single oil drop microcapsules. This system of microcapsules is further characterized by a high solids content, viz., from about 25 to about 50 weight percent solids, in combination with a low viscosity, viz., ranging from about 10 to about 60 centipoises and having a high microcapsule payload (core concentration by weight based on total capsule weight), e.g., of 80+ wt. % and preferably about 90 weight percent and higher, in aqueous suspensions. The combination of high solid content and high microcapsule payload, with low viscosity enables delivery of a high concentration of solid microcapsules at reasonably high coating speeds via comparatively inexpensive conventional pumping systems and paper coating systems. The present gelatin based microcapsule system is arrived at by blending low Bloom strength gelatin, e.g., about 100 to 200 Bloom strength, with a blend of at least two anionic phase inducers comprising (1) sodium hexametaphosphate (SHMP), and at least one of: (2) a copolymer of vinyl methyl ether and maleic anhydride (PVM/MA), (3) a copolymer of ethylene and maleic anhydride (E/MA), (4) gum arabic and (5) carboxy methyl cellulose (CMC).

8 Claims, No Drawings

HIGH SOLIDS, LOW VISCOSITY CARBONLESS PAPER GELATIN BASE MICROCAPSULE SYSTEM

BRIEF DESCRIPTION OF THE INVENTION

The present invention is directed to a high solid, low viscosity carbonless paper gelatin base microcapsule system producing microcapsules having sizes characteristically from about 3 to about 10 microns (micrometers) and being characterized as single oil drop microcapsules. This system of microcapsules is further characterized by a high solids content, viz., from about 25 to about 50 weight percent solids, in combination with a low viscosity, viz., ranging from about 10 to about 60 centipoises and having a high microcapsule payload (core concentration by weight based on total capsule weight), e.g., of 80+ wt. % and preferably about 90 weight percent and higher, in aqueous suspensions. The combination of high solid content and high microcapsule payload, with low viscosity enables delivery of a high concentration of solid microcapsules at reasonably high coating speeds via comparatively inexpensive conventional pumping systems and paper coating systems. The present gelatin based microcapsule system is arrived at by blending low Bloom strength gelatin, e.g., about 100 to 200 Bloom strength, with a blend of at least two anionic phase inducers comprising (1) sodium hexametaphosphate (SHMP), and at least one of: (2) a copolymer of vinyl methyl ether and maleic anhydride (PVM/MA), (3) a copolymer of ethylene and maleic anhydride (E/MA), (4) gum arabic and (5) carboxy methyl cellulose (CMC).

This microcapsular system is particularly well suited for use in making carbonless paper because it is capable of delivering high solids content microcapsules using a free-flowing aqueous dispersion or aqueous emulsion which is capable, due to its low viscosity, of being pumped and coated at the speeds and with the efficiency desired for the preparation of carbonless paper.

BACKGROUND OF THE INVENTION AND PRIOR ART

It has long been an objective in the making of carbonless paper incorporating gelatin based microcapsules as color forming agents to deliver a high concentration of the microencapsulated color-forming components onto the paper substrate. This has been difficult to accomplish, however, due to the difficulty in obtaining a high concentration of microencapsulated internal phase (core) product in the aqueous dispersions and emulsions which are most conveniently employed as aqueous systems to deliver the microencapsulated color-forming components onto the paper substrate.

The use of aqueous delivery systems for the microencapsulated color-formers permits pumping and delivery (coating) techniques which are compatible with high speed paper coating operations.

In prior attempts to increase the concentration of the gelatin based microencapsulated color-formers, the viscosity increased to such an extent as to make the paper coating impractical and inefficient due to the adverse effects this increased viscosity had upon the pumping systems and delivery system in the paper coating operation.

Conventional aqueous microencapsulation of carbonless core color phase using gelatin as a basic microcapsule raw material has been observed in the prior art to be limited to concentrations of approximately 20 weight percent total solids as a maximum practical concentration. This was noted in U.S. Pat. No. 4,760,108 wherein it was stated at column 1, lines 40 through 52, that when making microcapsules which are obtained by the complex coacervation process making use of gelatin and an anionic electrolyte of a high molecular weight, there were several problems encountered including the difficulty in obtaining microcapsule systems having a solid content higher than 20% due to the mechanism of the coacervation process. It was further stated that these microcapsules have low productivity per unit volume and require high transportation cost and when used as a coating material for carbonless copying paper and the like, a great deal of water has to be caused to evaporate for drying the coated materials, leading to still-standing serious problems on the efficiency of coating work and energy cost.

Such prior art microencapsulation systems were generally comprised of gelatin as a basic polymer and using anionic microencapsulation polymer, such as gum arabic, polyvinyl methyl ether maleic anhydrides copolymer (PVM/MA), carboxy-methyl cellulose, and combinations thereof with other polymers.

An alternate approach, such as in U.S. Pat. No. 4,087,376 issued to Peter L. Foris et al., is directed to a process for preparing non-gelatin microcapsules, en masse, by an in situ polymerization reaction to yield capsule wall material. The polymerization includes a reaction between urea and formaldehyde or polycondensation of monomeric or low molecular weight polymers of dimethylol urea or methylated dimethylol urea in an aqueous vehicle with the reaction being conducted in the presence of a negatively-charged, carboxyl-substituted, linear aliphatic hydrocarbon polyelectrolyte material dissolved in the vehicle. Liquid-liquid phase separation is accomplished and maintained by increase in the molecular weight of the resulting condensation polymer without further dilution of the manufacturing vehicle. The negatively-charged polyelectrolyte material is required and has an apparent effect of controlling or modifying the polymerization reaction. The Foris et al. microencapsulation process is stated by the patentees to permit the manufacture of microcapsules in concentrations of microcapsule to microcapsule manufacturing vehicle higher than previously possible.

U.S. Pat. No 4,760,108 to Makoto Asano et al. is directed to microcapsule-containing, water-base coating formulation comprising as essential components (a) microcapsules making use of a synthetic resin as a wall-forming material and (b) a reaction product obtained by polymerizing at least one water-soluble vinyl monomer (B) in the presence of a high polymer latex (A) having a glass transition point of 60 degrees C. or lower. The latex (A) and vinyl monomer (B) are used at a solid weight ratio of 3.97–90:10. The water-base coating formulations are stated to provide a microcapsule-coated layer having significantly-improved pressure resistance and frictional stability without need for a stilt. The water-base coating formulation is stated to be capable of being applied at a high speed, thereby making a significant improvement to the productivity of carbonless copying and/or recording paper.

U.S. Pat. No. 4,205,060 issued to H. G. Monsimer et al. is directed to the preparation of microcapsules appearing to consist of strings of spheres with the individual spheres in the string being about 20 to 30 microns in diameter. Methyl cellulose or ethyl cellulose can be employed in conjunction with a polyvinyl methyl ether/maleic anhydride (PVM/MA) polymer such as "Gantrez AN-169" to produce these strings of spheres with the internal phase being various medicaments. The Monsimer et al microencapsulation procedure is a non-gelatin system.

U.S. Pat. No. 4,808,408 issued to Richard W. Baker et al. is directed to the formation of microcapsules using gelatin and gum arabic hardened with a combination of formaldehyde and glutaraldehyde. In Example 5 of the Baker et al patent, it is stated that a copolymer of methyl vinyl ether and maleic anhydride ("Gantrez AN-119") functions as a pharmaceutical vehicle, e.g., to produce a resulting cream for application to human skin. The formulation of Example 5 contains 91 parts by eight of microcapsules with 9 parts by weight of the "Gantrez AN-119" solution as a pharmaceutical vehicle. The microcapsules have microcapsular material made from gelatin and gum arabic hardened with a combination of glutaraldehyde and formaldehyde.

U.S. Pat. No. 4,082,688 issued to Setsuya Egawa et al. teaches using polyvinyl methyl ether/maleic copolymer and gum arabic hardened with aqueous glutaraldehyde to obtain a microcapsular system having more than 95%, by number, of the microcapsules being mononucleic. These mononucleic microcapsules are stated to be of single emulsified droplets. These microcapsules were then coated onto test paper and color developed when used in conjunction with a sensitized receiving sheet after marking same.

U.S. Pat. No. 3,872,024 issued to Georg Horger is directed to a process for microencapsulation using gelatin in liquid-liquid phase separation utilizing certain inorganic polymeric materials as phase-separation-inducing materials. The Horger microencapsulation process employs simple coacervation of gelatin and employs inorganic polymer materials, e.g., sodium polymetaphosphates as phase separation inducing agents. Example 1 of Horger illustrates use of sodium hexametaphosphate (Calgon) as the phase separation inducing agent in microencapsulation of oily core materials, e.g., coloring agents using a gelatin microcapsule raw material which can be hardened later using an aldehyde(s). The microcapsules produced by the Horger patent process are characteristically large microcapsules, e.g., hundreds of microns in diameter.

U.S. Pat. No. 4,105,823 issued to David John Hasler et al. is directed to a method of microencapsulating finely divided particulate material, such as minute droplets of a water-immiscible liquid, to produce microcapsules in which the particulate core material is surrounded by polymeric shells. This method comprises the steps of forming a dispersion of the particular material in an aqueous medium containing a water-soluble urea formaldehyde precondensate, a water-soluble melamine formaldehyde precondensate and a water-soluble polymer which is capable of being cross-linked by said precondensates, and condensing said precondensates by acid catalysis with resultant cross-linking of the polymer about the particulate material so as to form the polymeric shells. The polymer may be a cellulose derivative, starch, a starch derivative, a polyacid, a polyester, a polyanhydride copolymer, a polyacrylamide or a polyacrylamide copolymer, and is preferably an acrylamide/acrylic acid copolymer.

DETAILED DESCRIPTION OF THE INVENTION

The benefits and advantages attendant to the readily reproducible high solids, high microcapsule core payload, low viscosity gelatin based carbonless paper microcapsules and microcapsular system of the present invention are arrived at by blending of (A) low bloom gelatin and (B) a blend of two or more anionic phase inducers at least one of which is (1) sodium hexametaphosphate (SHMP) with at least one of (2) a copolymer of vinyl methyl ether and maleic anhydride (PVM/MA), (3) a copolymer of ethylene and maleic anhydride (E/MA), (4) gum arabic and (5) carboxy methyl cellulose (CMC).

It has been discovered that sodium hexametaphosphate (SHMP), an inorganic anionic polymer, has a sufficiently high charge density to bring about coacervation at higher concentrations of solids. However, complex coacervation of gelatin by sodium hexametaphosphate, itself, brings about a very viscous coacervate, causing uncontrolled agglomeration of the desired individual microencapsulated single drop capsule phase droplets.

The present invention describes processes and products wherein single oil drop emulsions in the size range of about 3 to about 10 microns are microencapsulated as single oil drop microcapsules. In accomplishing this within the present invention, the viscosity of the induced coacervate phase is controlled to promote deposition of the low Bloom strength, e.g., Bloom strengths of about 100 to about 200 gelatin coating on the oil drops of the appropriate size without agglomerating these individual particles. Furthermore, this invention enables the microcapsular wall material to be completely phase out from solution onto the oil droplets so as to phase out from solution all of the colloid charged into the system, thereby permitting gelation and cross linking of the microcapsular walls to be carried out without an increase in viscosity or gelation of the continuous aqueous phase. This coacervate viscosity control has been obtained within this invention by the judicious blending of (A) a low bloom gelatin and (B) a blend of anionic phase inducers including (1) sodium hexametaphosphate, and at least one other anionic phase inducer selected from the group consisting of: (2) a copolymer of vinyl methyl ether and maleic anhydride, (3) a copolymer of ethylene and maleic anhydride (EMA) (4) gum arabic and (5) carboxy methyl cellulose. Utilizing this system within the purview of this invention, there has been accomplished the production of aqueous dispersions or emulsions containing from about 25 weight percent to about 50 weight percent of micro encapsulated single oil drop microcapsules containing a color producing material wherein the aqueous dispersion/emulsion has a low viscosity ranging from about 10 to about 60 centipoises without agglomerating the individual single microcapsules and wherein the range of individual microcapsular size (diameter) ranges from about 3 to about 10 microns.

Typically the individual microcapsules have 80+ wt. % core material and, more preferably, contain about 90 wt. % or higher core material with the remainder being cell wall material.

The invention will be described in greater detail in the examples which follow.

EXAMPLE 1

(Gelatin, CMC, SHMP, microencapsulation of internal phase core material at a ratio of 15 weight parts internal phase to 1 weight part gelatin)

100 grams of a 10% by weight solution of 160 bloom strength gelatin was weighed out in a Waring Blender cup. Then 50 grams of deionized water at 50 degrees C. was added thereto.

Into the gelatin solution there was blended 150 grams of carbonless paper internal phase (core material), comprising a solvent mixture of alkylated biphenyl and alkyl aromatic solvents containing 0.9% crystal violet lactone and 0.1% 3,3-Bis (1-butyl-2-methylindol-3-yl) phthalide, blended to an average droplet size of about 5 microns. This emulsion was then transferred to a beaker equipped with a mixing blade. Then 200 grams of deionized water at 40 degrees C. was added thereto. 15 grams of a 5 weight percent aqueous sodium hexametaphosphate solution was added to the beaker along with 45 grams of a 2 weight percent aqueous solution of sodium carboxy methyl cellulose. Using 14 weight percent aqueous acetic acid, the pH was lowered from its indicated value of approximately 6.0 pH the lower pH of about 4.7.

Then with continuous agitation, the batch was cooled slowly from about 40 degrees C. to about 28 degrees C. whereupon the batch was then chilled to about 15 degrees C.

This batch was then hardened by the addition of about 1.9 cc. 37 weight percent aqueous formaldehyde solution and 2.5 cc. of 25 weight percent aqueous glutaraldehyde solution.

After sufficient microcapsule cell wall hardening had taken place, viz., about 180 minutes, the batch temperature was raised to 25 degrees C. and the pH of the batch was adjusted to pH 10 using 20 weight percent aqueous sodium hydroxide solution. This low viscosity microcapsular suspension (dispersion) had a solid concentration of 30 weight percent and a viscosity of 12.0 centipoise and was thereafter formulated with binders and stilt materials to yield conventional carbonless paper "CB" sheets, viz., microcapsule coated back sheets, in accordance with the below indicated formulation procedure:

Using the microcapsule slurry described above, a water base coating formulation of the following composition was prepared:

|  | Parts slurry | Solids |
| --- | --- | --- |
| Microcapsule slurry | 166.7 | 50 |
| Starch particles | 20.0 | 20 |
| Cooked starch (25% solution) | 20.0 | 5 |
|  | 206.7 | 75 |

Its solids content was 28.1%. Microcapsule payload was approximately 92.8 wt. % with the remainder being cell wall. It was applied by Meyer rod bar coated onto base paper, to give a dry coating of 4.5 g/m$^{-2}$, and thus dried, thereby obtaining a CB (coated back) sheet for carbonless copying paper.

The coating slurry described above had a viscosity of 10.0 centipoises.

EXAMPLE 2

[Gelatin, PVM/MA, and SHMP ("Calgon") microencapsulation]

During this procedure, microencapsulation of the color forming internal phase material indicated hereinabove in Example 1 was carried out at a ratio of 15 parts by weight internal phase to 1 weight part of gelatin in the following manner.

100 grams of a 10 weight percent aqueous solution of 160 bloom strength gelatin was added to a Waring Blender cup. 50 grams of deionized water at 50 degrees C. was then added thereto. There was blended into the gelatin sol 150 grams of the carbonless paper internal phase material of Example 1 to obtain an average drop size of 5 microns. This emulsion was then transferred to a beaker fitted with a mixing blade and 210 grams of deionized water at 40 degrees C. were added thereto.

10 gram of a 5 weight percent sodium hexametaphosphate aqueous solution and 20 grams of a 2 weight percent solution of "Gantrez resin AN-119/AN-139" were added in a 1:1 blend by weight. The pH of this emulsion was adjusted from approximately pH 6.0 to pH 5.2 with 14 weight percent aqueous acetic acid solution. This mixture was slowly cooled from 40 degrees C. to about 28 degrees C. Then the batch was chilled from 28 degrees C. to 15 degrees C. adjusting the pH from a pH of 5.2 to pH 5.0 again using 14 weight percent aqueous acetic acid at 14 degrees C.

The resultant microcapsules were hardened by the addition of about 1.9 cubic centimeters of 37 weight percent aqueous formaldehyde solution and about 2.5 cubic centimeters of a 25 weight percent aqueous glutaraldehyde solution. This micro encapsulated internal phase aqueous dispersion/emulsion contained 30 weight percent total of micro encapsulated solids and had a low viscosity of 31 centipoises. This 30 percent total solids system was then coated onto "CB" sheets as described in Example 1. Microcapsule payload was approximately 93.2 wt. % with the remainder being cell wall material.

EXAMPLE 3

(Microencapsulation with gelatin, gum arabic, SHMP and PVM/MA)

100 grams of a 10 weight percent aqueous 160 bloom strength gelatin solution were weighed out and placed in a Waring Blender cup. 50 grams of deionized water maintained at 50 degrees C. were added thereto. Then there was blended into this aqueous gelatin sol 200 grams of carbonless paper internal phase material having the composition as noted in Examples 1 and 2, to produce a blended average internal phase droplet size of 5 microns. Then this emulsion was transferred to a beaker fitted with a mixing blade and 50 grams of a 10 weight percent aqueous gum arabic solution were added thereto along with 205 grams of deionized water at 40 degrees C. Thereafter, there was added 10 grams of a 2 weight percent PVM/MA solution of "Gantrez AN-903" solution followed by the addition of 20 grams of a 5 weight percent aqueous sodium hexametaphosphate solution and the pH of the system was adjusted from approximately pH 5.5 to pH 4.5 using 14 weight percent aqueous acetic acid solution. Thereafter, the batch was cooled under agitation from about 40 degrees C. to about 28 degrees C. Then the batch was chilled to 15 degrees C. and hardened using approximately 1.9 cubic centimeters of a 37 weight percent aqueous formaldehyde solution plus 2.5 centimeters of 25 weight percent aqueous glutaraldehyde.

After the desired extent of hardening was accomplished, viz., 180 minutes, this 34 weight percent total solids, low viscosity (22.5 centipoises) aqueous slurry was adjusted to a pH of 10 and processed for coating onto "CB" sheets in accordance with the procedures previously described in Examples 1 and 2. Microcapsule payload was approximately 92.5 wt. % with the remainder being cell wall material.

EXAMPLE 4

A strong black print carbonless paper system was prepared, using a color forming internal phase core material comprising a solvent mixture of alkylated biphenyl and alkyl aromatic mixed solvent blend and 1.8 wt. % of 2-anilino-3-methyl-6-diethylamino-fluoran and 0.1 wt. % each of crystal violet/lactone and 3,3-Bis (1-butyl-2-methyl indol-3-yl) phthalide.

200 grams of this internal phase was encapsulated by the process described in Example 3. The resulting capsule slurry had a solid content of 35% total solids and a low viscosity of 24.4 centipoises. Microcapsule payload was 92.5 wt. % with the remainder being cell wall material.

EXAMPLES 5-10

Using the procedures set forth in Examples 1-3 above, there were produced microencapsulated aqueous suspensions having the following combinations of solids content and capsule payload with viscosity as shown in Table 1 below:

TABLE 1

| Example No. | Solids Content (Weight % Micro Capsules) | Viscosity (Centipoises) | Capsule Payload (wt. % core) |
|---|---|---|---|
| 5 | 33.9% | 12.0 | 94.5 |
| 6 | 41.2% | 25.5 | 94.5 |
| 7 | 41.5% | 55.0 | 95.0 |
| 8 | 30.1% | 16.0 | 92.8 |
| 9 | 25.1% | 12.3 | 92.8 |
| 10 | 36.0% | 22.5 | 93.1 |

In all of the preceding Examples, 5 through 10, the core oil was the same as that of Example 1 and the low Bloom gelatin was 160 Bloom strength gelatin as described in Examples 1-3. The anionic phase inducer components present in each of respective Examples 5-10, inclusive, are tabulated hereinbelow. These are the respective blends of two or more anionic phase inducers, including sodium hexametaphosphate, and at least one other anionic phase inducer are shown below in Table 2:

TABLE 2

| Example No. | Anionic Phase Inducers (Wt. % of Total Mix) |
|---|---|
| 5 | 0.35% SHMP/0.43% CMC |
| 6 | 0.35% SHMP/0.43% CMC |
| 7 | 0.35% SHMP/0.43% CMC |
| 8 | 0.46% SHMP/0.56% CMC |
| 9 | 0.46% SHMP/0.56% CMC |

TABLE 2-continued

| Example No. | Anionic Phase Inducers (Wt. % of Total Mix) |
|---|---|
| 10 | 0.42% SHMP/2.1% Gum Arabic/0.08% PVMMA |

The viscosities were measured with a Brookfield Viscosimeter model LVS at a temperature of approximately 25.5 degrees C. using a number 1 spindle at rpm (revolutions per minute) of 6, 12, 30 and 60.

The "CB" sheets prepared in accordance with Examples 1-10, inclusive, were combined with "CF" (coated front) sheets and the appropriate marking pressure was applied to each respective CB sheet to result in the production of a strong blue colored mark, thereby illustrating the usefulness of the present invention to prepare "CB" sheets. The "CF" sheets were prepared in accordance with known technology basically as follows:

A CF coating can be prepared by coating paper containing a mixture of the following mixture with reactive color forming materials such as kaolin clay, calcined clay, and/or phenolic resins and appropriate binders and fill material such as calcium carbonate, titanium oxide or zinc oxide.

I claim:

1. A high solids, low viscosity aqueous suspension of single oil drop, gelatin base, high payload microcapsules having an average particle size ranging from about 3 to about 10 microns wherein each microcapsule has a microcapsule wall material of low Bloom gelatin, blended with at least two anionic phase inducers comprising sodium hexametaphosphate and at least one additional phase inducer selected from the group consisting of a copolymer of vinyl methyl ether and maleic anhydride, a copolymer of ethylene and maleic anhydride, gum arabic and carboxy methyl cellulose, wherein said microcapsules have in an internal phase of a color-producing oily material and wherein the solids content of said suspension ranges from about 25 weight percent to about 50 weight percent in combination with a low viscosity ranging from about 10 to about 60 centipoises.

2. A suspension as in claim 1 wherein said microcapsule payload is about 90 wt. % and higher.

3. A suspension as in claim 1 wherein said additional anionic phase inducers includes carboxy methyl cellulose.

4. A suspension as in claim 1 wherein said additional anionic phase inducers includes a copolymer of vinyl methyl ether and maleic anhydride.

5. A suspension as in claim 1 wherein said additional anionic phase inducers includes a copolymer of ethylene and maleic anhydride.

6. A suspension as in claim 1 wherein said additional phase inducers includes gum arabic.

7. A suspension as in claim 1 wherein said additional phase inducers include gum arabic and a copolymer of vinyl methyl ether and maleic anhydride.

8. A suspension as in claim 1 wherein said additional phase inducers include gum arabic and a copolyumer of ethylene and maleic anhydride.

* * * * *